(12) United States Patent
Kobayashi

(10) Patent No.: US 10,971,911 B2
(45) Date of Patent: Apr. 6, 2021

(54) WIRE LEADING TOOL

(71) Applicant: Yanegijutsukenkyujo Co., Ltd., Takahama (JP)

(72) Inventor: Shuichi Kobayashi, Takahama (JP)

(73) Assignee: Yanegijutsukenkyujo Co., Ltd., Takahama (JP)

( * ) Notice: Subject to any disclaimer, the term of this patent is extended or adjusted under 35 U.S.C. 154(b) by 0 days.

(21) Appl. No.: 16/868,749

(22) Filed: May 7, 2020

(65) Prior Publication Data

US 2020/0389003 A1 Dec. 10, 2020

(30) Foreign Application Priority Data

Jun. 4, 2019 (JP) .............................. JP2019-104240

(51) Int. Cl.
*H02G 3/22* (2006.01)
*H02G 3/06* (2006.01)
*E04D 1/30* (2006.01)

(52) U.S. Cl.
CPC ............. *H02G 3/22* (2013.01); *H02G 3/0633* (2013.01); *E04D 2001/307* (2013.01)

(58) Field of Classification Search
CPC ... H02G 3/22; H02G 3/0633; E04D 2001/307
See application file for complete search history.

(56) References Cited

U.S. PATENT DOCUMENTS 3,809,798 A * 5/1974 Simon .................. H02G 3/0633
174/59
9,153,950 B2 * 10/2015 Yamanaka .............. E04D 13/00

FOREIGN PATENT DOCUMENTS

| DE | 102008026950 A1 * | 12/2009 | ............... E04D 1/30 |
| FR | 2977395 A1 * | 1/2013 | .......... H02G 3/0633 |
| JP | 4869141 B2 | 11/2008 | |
| JP | 2008266977 A * | 11/2008 | |
| JP | 2011208446 A * | 10/2011 | |

* cited by examiner

*Primary Examiner* — Adriana Figueroa
(74) *Attorney, Agent, or Firm* — Yoshida & Associates LLC; Kenichiro Yoshida

(57) ABSTRACT

A main body of a wire leading tool including a lid body that covers the main body in a detachable manner is configured to include a flat plate-shaped base portion, a base hole portion that is penetratingly provided in the base portion, a standing wall portion that stands from the base portion in a U shape and surrounds the base hole portion by a curved portion of the U shape, and a connector supporting portion that stands from the base portion at a position closer to the base hole portion relative to an open end of the U shape of the standing wall portion, is continuous to the standing wall portion on both sides, and has an insertion hole which is penetratingly provided for inserting a pipe connecter.

5 Claims, 7 Drawing Sheets

WIRE LEADING TOOL

BACKGROUND OF THE INVENTION

Field of the Invention

The present invention relates to a wire leading tool that is used for leading wires into a building from the upper side of a roof.

Description of the Related Art

The present applicant has proposed a wire leading tool for leading, into a building, wires such as output electric wires from solar cell modules installed on a roof or an antenna wire from a television antenna (see Patent document 1, Japanese Patent No. 4869141). The wire leading tool has a hole portion bored in a base portion that is used instead of a roofing material laid on the roof. The wire leading tool is installed on the roof at a position at which the hole portion communicates with a roof through-hole, so that the wires can be led into the building from the upper side of the roof through the hole portion and the roof through-hole.

In the wire leading tool, a standing wall portion standing from the base portion is opened toward the eaves side and upward, and surrounds a passage of the wires which are led into the hole portion from an eaves-side end. The wire leading tool includes a lid body that is detachably attached to the standing wall portion and covers, from above, a space surrounded by the standing wall portion. The wire leading tool having such a configuration can facilitate an operation of leading the wires into the hole portion because a space above the passage of the wires which are led into the hole portion and a space above the hole portion are largely opened by detaching the lid body. The hole portion is surrounded by the standing wall portion and is opened in the space covered by the lid body from above, so that the lid body and the standing wall portion can prevent rainwater flowing down on the roof from flowing into the hole portion.

When the wires are arranged on the roof, the wires can be made into a state of being inserted into a pipe such as a steel pipe in order to protect the wires. A wire leading tool suitable for leading, into a building, the wires arranged on the roof in such a state has been therefore required.

Patent Document No. 1: Japanese Patent No. 4869141

SUMMARY OF THE INVENTION

The present invention has been made in consideration of the above-mentioned circumstances, and an object thereof is to provide a wire leading tool suitable for leading, into a building, wires arranged on roof in a state of being inserted into a pipe.

In order to achieve the above-mentioned object, a wire leading tool according to an aspect of the present invention is "a wire leading tool for leading a wire into a building from an upper side of a roof, the wire leading tool including:

a main body and a lid body that is detachably attached to the main body, wherein the main body includes:
a flat plate-shaped base portion;
a base hole portion that is penetratingly provided in the base portion;
a standing wall portion that stands from the base portion in a U shape and surrounds the base hole portion by a curved portion of the U shape; and
a connector supporting portion that stands from the base portion at a position closer to the base hole portion relative to an open end of the U shape of the standing wall portion, is continuous to the standing wall portion on both sides, and has an insertion hole which is penetratingly provided for inserting a pipe connector, and
the lid body includes:
a peripheral wall portion that surrounds the standing wall portion; and
a covering portion that covers a space surrounded by the standing wall portion."

Examples of the "wire" can include an output electric wire from a solar cell module or a wind-power generation device installed on the roof, an antenna wire from a television antenna, and an input electric wire to an illumination device.

When the wire leading tool having this configuration is used, the main body is mounted on the roof such that the base hole portion communicates with a through-hole which is penetratingly provided in the roof. The wire leading tool includes the connector supporting portion, and the insertion hole for inserting the pipe connecter therethrough is formed in the connector supporting portion. The pipe connector can therefore fix, to the connector supporting portion, a pipe into which the wire has been inserted. Accordingly, the wire arranged on the roof in the state of being inserted into the pipe can be led into the space surrounded by the standing wall portion and can be led into the building through the base hole portion and the through-hole in the roof.

The base hole portion is opened in a space surrounded by the standing wall portion and covered by the lid body, thereby reducing the risk that rainwater flows into the building through the base hole portion.

Furthermore, the lid body is detachably attached to the main body. Therefore, an operation of connecting, to the pipe connector fixed to the connector supporting portion, the pipe into which the wire has been inserted and an operation of leading, into the building through the base hole portion, the wire led out from the pipe in the space surrounded by the standing wall portion can be easily performed in a state in which the lid body has been detached.

Although the connector supporting portion to which the pipe into which the wire has been inserted is fixed cannot but be provided at a position opened outward, the connector supporting portion stands from the base portion at the position closer to the base hole portion relative to the open end of the U shape of the standing wall portion, that is, in the space surrounded by the standing wall portion. Accordingly, the risk that rainwater enters the inner space through the insertion hole which is penetratingly provided in the connector supporting portion and enters the building through the base hole portion can be prevented.

The wire leading tool according to the aspect of the present invention can have the configuration in which "the connector supporting portion has equal to or more than one small-hole portion formed on a boundary with the base portion, and a hole size of the small-hole portion is equal to or smaller than 6 mm" in addition to the above-described configuration.

The "hole size" of the small-hole portion indicates a diameter thereof when the small-hole portion is a circular hole and indicates a distance of a portion with the largest distance between sites of a peripheral edge when the small-hole portion is a non-circular hole.

With this configuration, the connector supporting portion has the small-hole portion formed on the boundary with the base portion. When the main body is mounted on the roof such that the connector supporting portion is on the eaves side and the base hole portion is on the ridge side, even if rainwater enters the space surrounded by the standing wall portion for some reason, the rainwater flowing down on the base portion in the roof inclination direction (direction toward the eaves from the ridge) is discharged through the small-hole portion, thereby preventing the rainwater from entering the building through the base hole portion.

Furthermore, the hole size of the small-hole portion is equal to or smaller than 6 mm. Therefore, rainwater can sufficiently pass through the small-hole portion but small creatures such as insects cannot pass therethrough. The risk that the small creatures enter the space surrounded by the standing wall portion from the outside through the small-hole portion for discharging water and eventually enter the building through the base hole portion can therefore be reduced.

The wire leading tool according to the aspect of the present invention can have the configuration in which "the main body and the lid body are made of metal, the lid body has a screw hole portion and the standing wall portion has a screwed groove, in a state in which the covering portion covers the space surrounded by the standing wall portion, a screw inserted through the screw hole portion and screwed with the screwed groove fixes the lid body to the standing wall portion, and the screw allows the lid body and the main body to be electrically conducted to each other by causing saw teeth provided on a screw head or saw teeth provided on a washer which is made to abut against the screw head to bite the lid body" in addition to the above-described configuration.

In general, when a screw is fastened to a member installed on roof, a waterproof packing is interposed between the screw and the member. The waterproof packing is generally formed with an electrically insulating material. By contrast, with this configuration, when both of the main body and the lid body are made of metal, the lid body and the main body are electrically conducted to each other through the screw by using, as a screw for fixing the lid body to the main body, the screw having a head with the saw teeth or using, as a washer interposed between the screw and the lid body, the washer with the saw teeth. That is to say, the screw for fixing the lid body to the main body is made to also have a role of allowing the lid body and the main body to be electrically conducted to each other.

The saw teeth of the screw head or the saw teeth of the washer against which the screw head is made to abut are made to bite the lid body. Therefore, even when a passive film is formed on the surface of the lid body, the screw and the lid body can be electrically conducted to each other reliably. On the other hand, the screwed groove is formed in the main body and the screw is screwed thereinto, so that the screw and the main body are electrically conducted to each other.

When a plurality of screws for fixing the lid body to the main body are provided, the lid body and the main body need not to be electrically conducted to each other through all of the screws but the lid body and the main body may be electrically conducted to each other through some of these screws.

The wire leading tool according to the aspect of the present invention can have the configuration in which "the main body further includes an arc-shaped wall, the arc-shaped wall stands from the base portion in a circular arc shape along a part of a peripheral edge of the base hole portion and is continuous to the standing wall portion on both sides to form a substantially circular shape together with the curved portion of the standing wall portion, and an upper end of the arc-shaped wall is formed in a circular arc shape recessed downward so as to be lowered as is farther from the standing wall portion and be the lowest at a center" in addition to the above-described configuration.

With this configuration, the wire led into the space surrounded by the standing wall portion is led into the base hole portion after climbing over the arc-shaped wall. Accordingly, even when rainwater flows along the wire and enters the space surrounded by the standing wall portion, the rainwater cannot flow upward along the wire going up to climb over the arc-shaped wall, thereby reducing the risk that the rainwater enters the base hole portion. The arc-shaped wall has the shape along the circular base hole portion. Therefore, an operation of leading, into the base hole portion, the wire going up to climb over the arc-shaped wall is easy to be performed. Furthermore, the arc-shaped wall has the shape recessed in the circular arc shape in the up-down direction. Therefore, even when the wire is inserted into a flexible tube in the space surrounded by the standing wall portion, the flexible tube is easy to be made along the arc-shaped wall. Accordingly, when the wire in the state of being inserted into the flexible tube is led into the base hole portion, a gap is hardly formed between it and the arc-shaped wall.

The wire leading tool according to the aspect of the present invention can have the configuration in which "the base portion has a ridge-side end side forming an inverted V shape" in addition to the above-described configuration.

With this configuration, the ridge-side end side having the inverted V shape guides rainwater flowing down on the roof to both sides. The risk that the rainwater flowing down on the roof runs upon the base portion can thereby be reduced.

As described above, the present invention can provide the wire leading tool suitable for leading, into the building, the wires arranged on the roof in the state of being inserted into the pipe.

DESCRIPTION OF THE EMBODIMENTS

Figure 1:
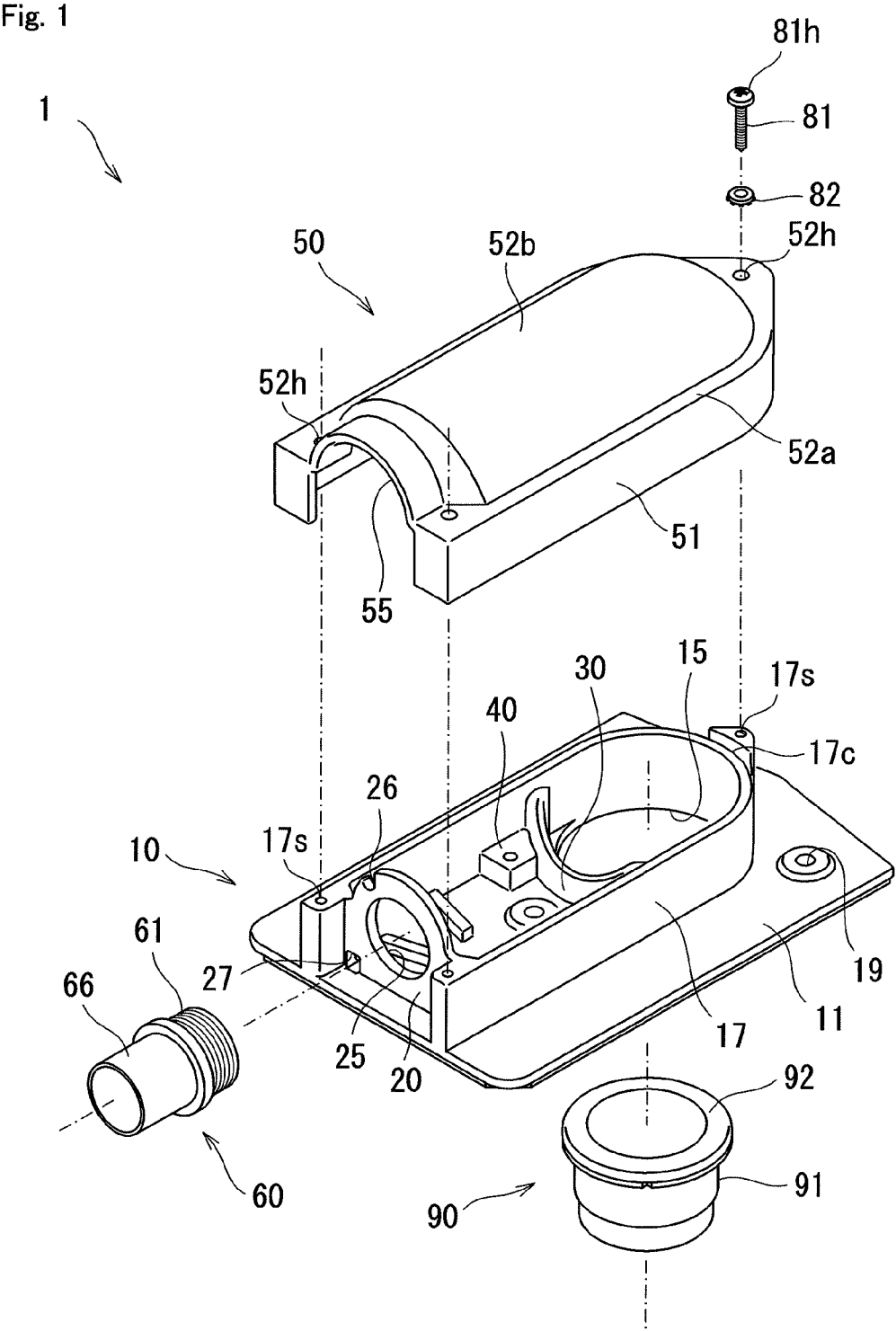
FIG. 1 is an exploded perspective view of a wire leading tool according to an embodiment of the present invention.
Figure 2:
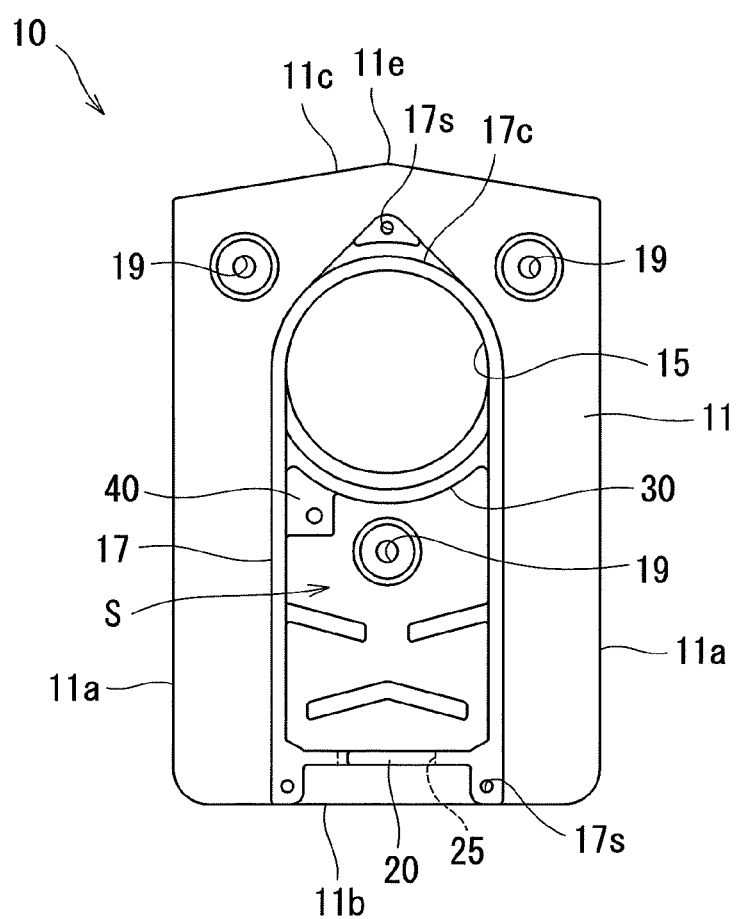
FIG. 2 is a plan view of a main body of the wire leading tool in FIG. 1.
Figure 3:
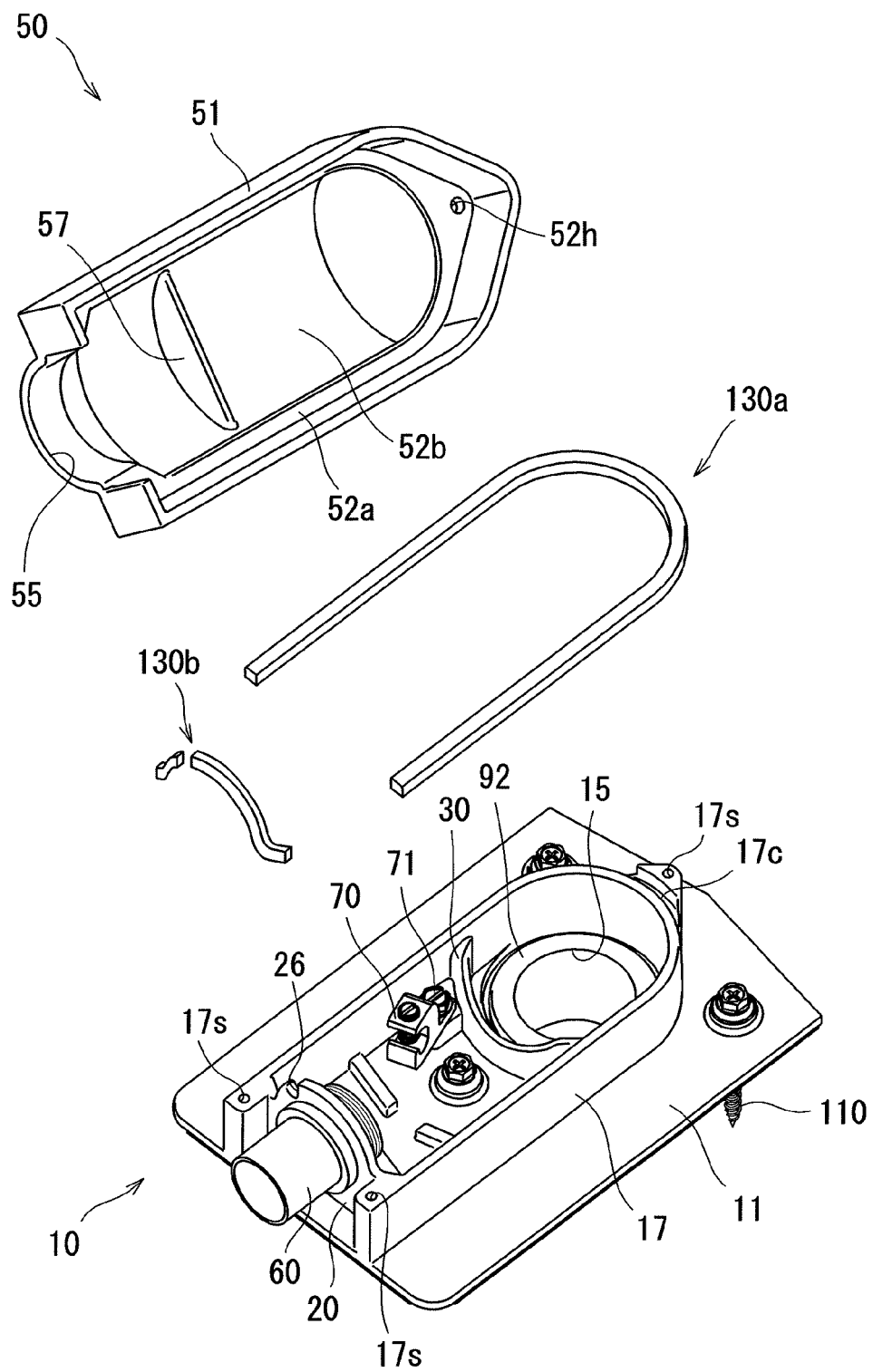
FIG. 3 is a perspective view of the main body of the wire leading tool in FIG. 1, which is illustrated together with a perspective view of a lid body when viewed from a bottom surface side.

Hereinafter, a wire leading tool 1 according to an embodiment of the present invention will be described with reference to FIG. 1 to FIG. 5. The wire leading tool 1 includes a main body 10 and a lid body 50 that is detachably attached to the main body 10. The main body 10 and the lid body 50 can be made of metal such as aluminum and stainless steel, resin having weather resistance, or ceramic, but both of them are made of metal in the embodiment.

The main body 10 mainly includes a base portion 11, a base hole portion 15, a standing wall portion 17, a connector supporting portion 20, and an arc-shaped wall 30. The base portion 11 has a flat plate shape and has a pair of parallel lateral sides 11a and 11a, an end side 11b orthogonal to the lateral sides 11a and 11a, and an end side 11c facing the end side 11b. The end side 11c forms an inverted V shape with a top portion 11e at the center.

The base hole portion 15 is a circular hole penetrating through the base portion 11 and is located to be closer to the top portion 11e relative to the center of the base portion 11. The standing wall portion 17 stands from the base portion 11 and has a U shape in plan view (view when the base portion 11 is seen from just above). In the standing wall portion 17, a curved portion 17c of the U shape is made along the base hole portion 15 and an open end of the U shape reaches the end side 11b. The open end of the standing wall portion 17 is formed to be thick, and screwed grooves 17s are provided in the open end. The curved portion 17c of the standing wall portion 17 is also formed to be thick so as to project toward the top portion 11e, and the screwed groove 17s is provided also in the curved portion 17c.

The connector supporting portion 20 stands from the base portion 11 at a position opposite to the base hole portion 15 near the open end of the U shape of the standing wall portion 17. Both sides of the connector supporting portion 20 are connected to the standing wall portion 17. A circular insertion hole 25 for inserting a pipe connector 60 therethrough is penetratingly provided in the connector supporting portion 20. The upper end of the connector supporting portion 20 is curved in a circular arc shape so as to keep a constant distance between it and the peripheral edge of the insertion hole 25. A C-shaped small notch 26 opened upward is formed in a part of the upper end of the connector supporting portion 20.

The connector supporting portion 20 has small-hole portions 27 on boundaries with the base portion 11. In the embodiment, two small-hole portions 27 are formed at positions being the boundaries with the base portion 11 and being boundaries with the standing wall portion 17 on both sides of the connector supporting portion 20. The size of each of the small-hole portions 27 is set to be equal to or smaller than 6 mm in a portion with the largest distance between sites of the peripheral edge. The hole size corresponds to a numerical value defined, by the United States, as an upper limit of an opening size of meshes arranged in a ventilation port ventilating the inside and outside of a building.

The arc-shaped wall 30 stands from the base portion 11 in a circular arc shape along a part of the peripheral edge of the base hole portion 15. A portion of the peripheral edge of the base hole portion 15 along which the arc-shaped wall 30 is formed faces the peripheral edge thereof along which the curved portion 17c of the standing wall portion 17 is formed, and both sides of the arc-shaped wall 30 are connected to the standing wall portion 17. The arc-shaped wall 30 forms a substantially circular shape together with the curved portion 17c of the standing wall portion 17 in plan view of the main body 10. The arc-shaped wall 30 is formed to be lowered as is farther from the standing wall portion 17 and be the lowest at the center, so that the upper end of the arc-shaped wall 30 is curved in a circular arc shape so as to be recessed downward when seen from the end side 11b side. That is to say, the arc-shaped wall 30 has the circular arc shape in plan view and the circular arc shape when seen from the end side 11b side.

The main body 10 has fixing hole portions 19 and a supporting table 40 of a grounding clamp 70 in addition to the above-described configuration. The fixing hole portions 19 are hole portions for inserting screws 110 therethrough, the screws 110 being used for fastening the main body 10 to the roof. In the embodiment, three fixing hole portions 19 in total are formed in the base portion 11 on both of the outer sides of the standing wall portion 17 and the inner side thereof. The peripheral edge of each fixing hole portion 19 is formed to be higher than the base portion 11 in order to prevent rainwater from flowing in the fixing hole portion 19.

The supporting table 40 is a pedestal on which the grounding clamp 70 holding a wire (not illustrated) for grounding is supported when the wires arranged on the roof are electric wires. The supporting table 40 is provided on the base portion 11 in the vicinity of the base hole portion 15. In the embodiment, the supporting table 40 is provided on a boundary between the arc-shaped wall 30 and the standing wall portion 17.

On the other hand, the lid body 50 has a peripheral wall portion 51 and covering portions 52a and 52b. The peripheral wall portion 51 has a U shape surrounding the standing wall portion 17 of the main body 10 from outside. The covering portions 52a and 52b are portions covering a space surrounded by the peripheral wall portion 51 excluding an open end of the U shape of the peripheral wall portion 51, and include the flat covering portion 52a and the curved covering portion 52b. The flat covering portion 52a is a flat portion along the peripheral wall portion 51 and is placed on the upper end of the standing wall portion 17 of the main body 10. The curved covering portion 52b is a portion curved so as to expand outward on the inner side relative to the flat covering portion 52a. Screw hole portions 52h are penetratingly provided in the covering portion 52a at positions identical to the screwed grooves 17s when the covering portion 52a is placed on the upper end of the standing wall portion 17.

The lid body 50 has a lid body opening 55 on the side of the open end of the U shape of the peripheral wall portion 51, and the covering portion 52b in the vicinity of the peripheral edge of the lid body opening 55 is formed to have a shape along the upper end of the connector supporting portion 20.

The lid body 50 further has a projecting wall 57 projecting from the lower surface thereof. The projecting wall 57 is formed to project at a substantially intermediate position between the arc-shaped wall 30 and the connector supporting portion 20 when the lid body 50 covers a space (hereinafter, referred to as a "space S in the standing wall") surrounded by the standing wall portion 17.

Figure 4:
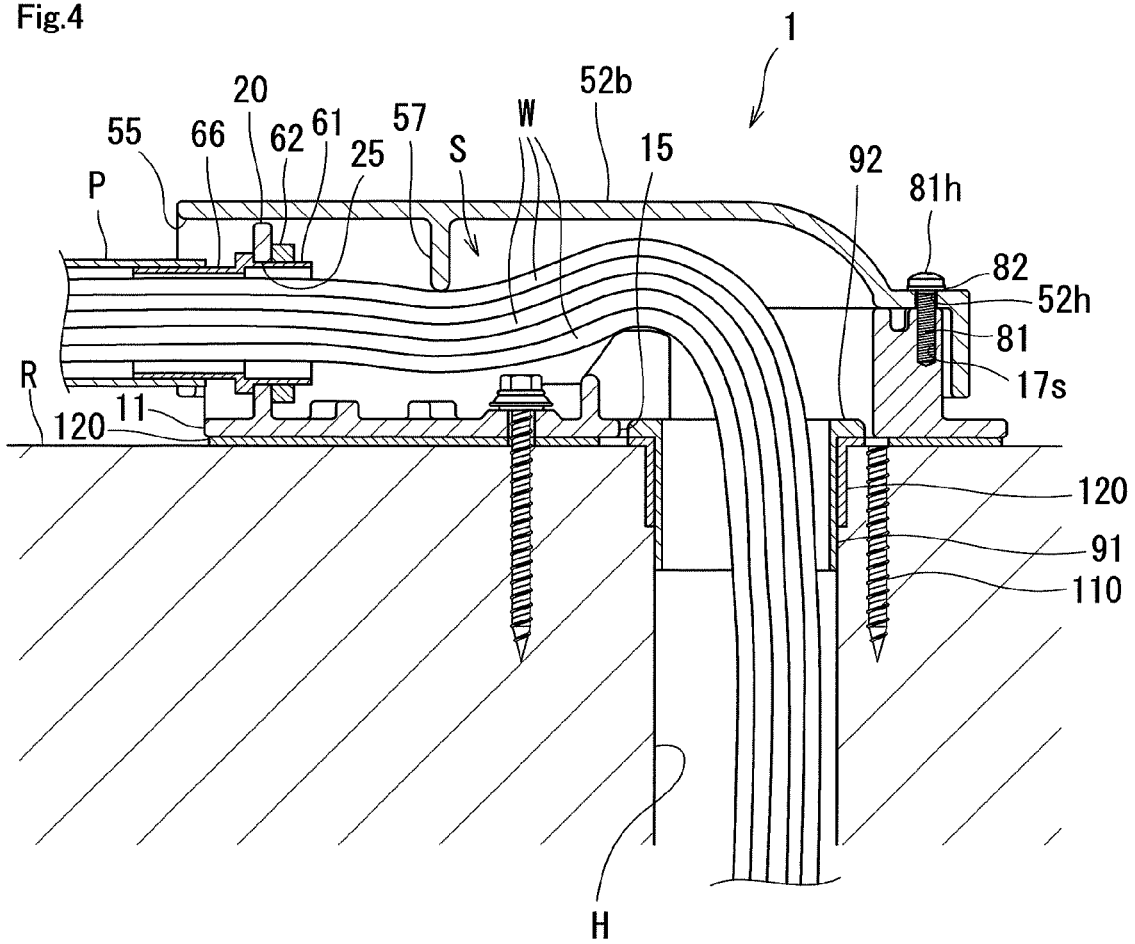
FIG. 4 is a cross-sectional view illustrating a usage state of the wire leading tool in FIG. 1.
Figure 5:
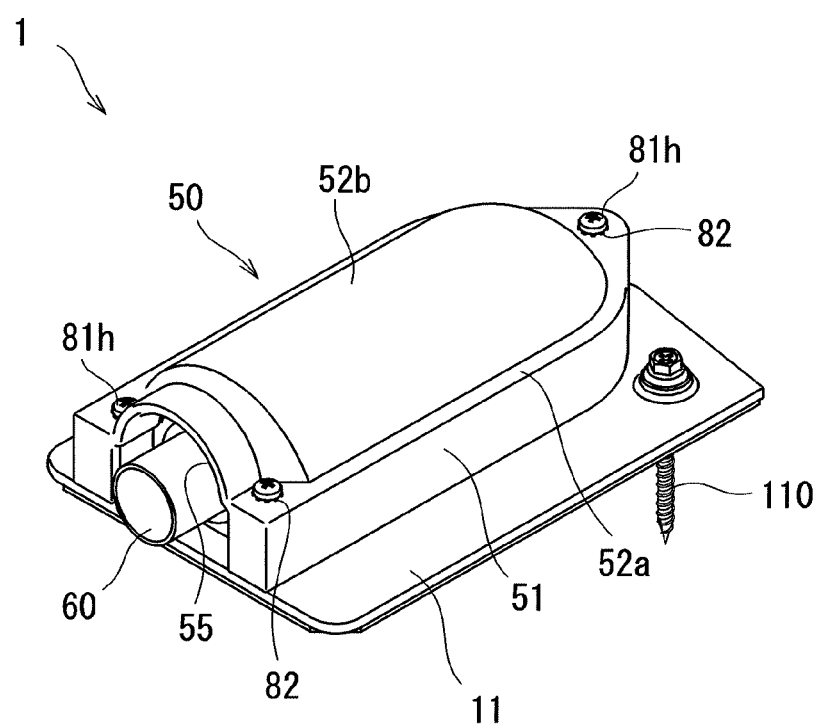
FIG. 5 is a perspective view illustrating the usage state of the wire leading tool in FIG. 1.

Next, a usage method of the wire leading tool 1 in the embodiment will be described mainly with reference to FIG. 4. A through-hole H is formed in the roof R before the wire leading tool 1 is installed. A guide cylinder 90 is inserted into the through-hole H. The guide cylinder 90 has a cylinder portion 91 having a slightly smaller diameter than that of the through-hole H and a flange portion 92 having a larger diameter than that of the through-hole H. The cylinder portion 91 is inserted into the through-hole H while the flange portion 92 is made to abut against the roof R from above.

Then, the main body 10 is placed on the roof R in a state in which the base portion 11 is made to abut against the roof R so as to make the through-hole H (and the cylinder portion 91) communicate with the base hole portion 15. Then, the main body 10 is directed such that the top portion 11e of the base portion 11 is on the ridge side and the end side 11b thereof is on the eaves side. Accordingly, the end side 11c in the embodiment corresponds to a "ridge-side end side" according to the present invention. A waterproof sheet 120 such as a butyl rubber sheet is interposed between the base portion 11 and the After that, the screws 110 inserted through the fixing hole portions 19 in the base portion 11 are screwed into the roof R to fix the main body 10 to the roof R.

The pipe connector 60 is inserted through the insertion hole 25 of the connector supporting portion 20 to fix the pipe connector 60 to the connector supporting portion 20. In this embodiment, the pipe connector 60 is fixed to the connector supporting portion 20 by inserting an end portion of the pipe connector 60, which has an external thread 61, through the insertion hole 25, and then, screwing the external thread 61 with a nut 62. The grounding clamp 70 is attached to the supporting table 40 (see FIG. 3). It should be noted that the pipe connector 60 and the grounding clamp 70 may be attached to the main body 10 before the main body 10 is fixed to the roof.

Thereafter, the pipe P into which the wires W extending from solar cell modules, a television antenna, or the like have been inserted is connected to a portion (hereinafter, referred to as an "outer connecting portion 66") of the pipe connector 60, which extends outward from the connector supporting portion 20. For example, when the outer connecting portion 66 has an external thread or an internal thread, a pipe which has an internal thread or an external thread on its end is screwed with the external thread or the internal thread of the outer connecting portion 66. Alternatively, a pipe having no external thread and no internal thread can be fixed to the connector supporting portion 20 by using the pipe connector 60 having the outer connecting portion 66 with an anchor pin advancing and retreating in the radial direction, inserting the pipe having a smaller diameter than that of the outer connecting portion 66 thereinto, and fixing them with the anchor pin.

After the pipe P is fixed to the connector supporting portion 20, the wires W led out from the pipe P are guided to the base hole portion 15 and are inserted into the through-hole H of the roof through the base hole portion 15 and the guide cylinder 90. The wires W are thereby led into the building from the upper side of the roof R. Furthermore, the grounding wire is led into the space S in the standing wall by being inserted through the notch 26 of the connector supporting portion 20, held by the grounding clamp 70, and led into the building through the base hole portion 15 similarly to the wires W. The grounding wire led into the building is fastened to a grounding terminal installed in the building.

The supporting table 40 in the embodiment is formed integrally with the main body 10 and is made of metal. The grounding clamp 70 made of metal is attached to the supporting table 40 with a bolt 71 made of metal. The main body 10 made of metal is conducted to the grounding wire through the grounding clamp 70.

After a leading operation of the wires and the grounding wire is finished, the flat covering portion 52a is placed on the upper end surface of the standing wall portion 17 and screws 81 inserted through the screw hole portions 52h are screwed into the screwed grooves 17s in the standing wall portion 17. The lid body 50 is thereby fixed to the main body 10.

In this embodiment, screws made of metal are used as the screws 81 for fixing the lid body 50 to the main body 10, and washers 82 made of metal and having saw teeth are interposed between screw heads 81h and the lid body 50. When the saw teeth of the washers 82 bite the lid body 50, the lid body 50 and the screws 81 are electrically conducted to each other. The screws 81 and the main body 10 are electrically conducted to each other by screwing the screws 81 into the screwed grooves 17s. Therefore, the lid body 50 and the main body 10 can be electrically conducted to each other through the screws 81.

When the lid body 50 covers the space S in the standing wall, a gap between the lid body 50 and the main body 10 can be filled by a sealing member. For example, a sealing member 130a such as a foamed resin can be made to previously adhere to the upper end of the standing wall portion 17 in a U-shaped form (see FIG. 3). Similarly, a sealing member 130b along the shape of the upper end of the connector supporting portion 20 can be made to adhere thereto. Furthermore, a sealing member between the base hole portion 15 and the wires can prevent rainwater from flowing down along the wires and entering the building through the base hole portion 15. For example, a gap around the wires led into the base hole portion 15 can be filled with a pasty sealing member.

As described above, with the wire leading tool 1 in the embodiment, the pipe connector 60 can fix, to the connector supporting portion 20, the pipe P into which the wires W have been inserted, and the wires W arranged on the roof R in the state of being inserted into the pipe P can be led into the space S in the standing wall and can be led into the building through the base hole portion 15. The base hole portion 15 is opened in the space S in the standing wall covered by the lid body 50, thereby reducing the risk that rainwater flows into the building through the base hole portion 15. The base portion 11 is arranged while the top portion 11e on the end side 11c faces the ridge side. Therefore, the end side 11c having the inverted V shape guides rainwater flowing down on the roof to both sides, and the risk that the rainwater runs upon the base portion 11 can be reduced.

Furthermore, the lid body 50 is detachably attached to the main body 10. Therefore, an operation of fixing, to the connector supporting portion 20 through the pipe connector 60, the pipe P into which the wires W have been inserted and an operation of leading, into the building through the base hole portion 15, the wires W led out from the pipe P into the space S in the standing wall can be easily performed in a state in which the lid body 50 has been detached.

The connector supporting portion 20 to which the pipe P through which the wires W have been inserted is fixed cannot but be provided at a position opened outward. Although the direction in which the connector supporting portion 20 is opened is the direction toward the eaves, rainwater can flow from the eaves side to the ridge side by being influenced by wind. To cope therewith, in the wire leading tool 1, the connector supporting portion 20 stands from the base portion 11 at a position closer to the base hole portion 15 relative to the end side 11b, that is, in the space S in the standing wall. Accordingly, the risk that the rainwater enters into the space S through the insertion hole 25 which is penetratingly provided in the connector supporting portion 20 can be prevented.

In addition, the lid portion opening 55 has the shape along the upper end of the connector supporting portion 20. Therefore, a gap is hardly formed between the lid body 50 and the main body 10 when the lid body 50 covers the space S in the standing wall, and the risk that rainwater enters the space S in the standing wall through the gap is prevented.

On the peripheral edge of the base hole portion 15, the arc-shaped wall 30 stands from the base portion 11 on the eaves side relative to the base hole portion 15. Therefore, the wires W led out into the space S in the standing wall from the pipe P fixed to the connector supporting portion 20 go up to climb over the arc-shaped wall 30, and then, are led into the base hole portion 15. Accordingly, even when rainwater flows along the wires W and enters the space S in the standing wall, the rainwater cannot flow upward along the going-up wires W, thereby preventing the rainwater from entering the base hole portion 15 beyond the arc-shaped wall 30. In particular, in the embodiment, the projecting wall 57 projecting downward from the back surface of the covering portion 52b in the lid body 50 presses down the wires W before the wires W go up along the arc-shaped wall 30. This configuration can increase a going-up angle of the wires W in comparison with the case of no projecting wall 57, so that entering of rainwater into the base hole portion 15 can be prevented more effectively.

Moreover, the arc-shaped wall 30 has the shape along the circular base hole portion 15. Therefore, an operation of leading, into the base hole portion 15, the wires W going up to climb over the arc-shaped wall 30 is easily performed. Furthermore, the arc-shaped wall 30 has the shape recessed in the circular arc shape in the up-down direction. Therefore, also when the wires W inserted into the pipe P on the roof are inserted into a flexible tube (not illustrated) in the space S in the standing wall, the flexible tube is easily made along the arc-shaped wall 30. Accordingly, when the wires in the state of being inserted into the flexible tube are led into the building through the base hole portion 15, a gap is hardly formed between the arc-shaped wall 30 and the flexible tube and an operation of causing the flexible tube to climb over the arc-shaped wall 30 is easily performed. In this case, the flexible tube is connected to the pipe connector 60 from the side of the space S in the standing wall.

Furthermore, the connector supporting portion 20 has the small-hole portions 27 formed on the boundaries with the base portion 11. Therefore, even if rainwater enters the space S in the standing wall for some reason, the rainwater flowing down on the base portion 11 in the roof flow direction is discharged through the small-hole portions 27.

The hole size of each of the small-hole portions 27 is set such that rainwater can sufficiently pass through the small-hole portion but small creatures such as insects cannot pass therethrough. Therefore, an action of discharging water by the small-hole portions 27 can be exerted while reducing the risk that the small creatures enter the building through the wire leading tool 1.

In addition, in the embodiment, the main body 10 and the lid body 50 both of which are made of metal are electrically conducted to each other through the screws 81 and the washers 82 with the saw teeth, and the grounding wire is coupled to the main body 10 with the grounding clamp 70. Accordingly, even when the sealing member arranged between the main body 10 and the lid body 50 for waterproofing is non-conductive, the overall wire leading tool 1 can be made into a state of being grounded. The wire leading tool 1 is therefore suitable for use when the wires W are electric wires.

Although the present invention has been described above using the preferred embodiment, the present invention is not limited by the above-described embodiment, and various improvements and changes in design can be made in a range without departing from the gist of the present invention.

Figure 6:
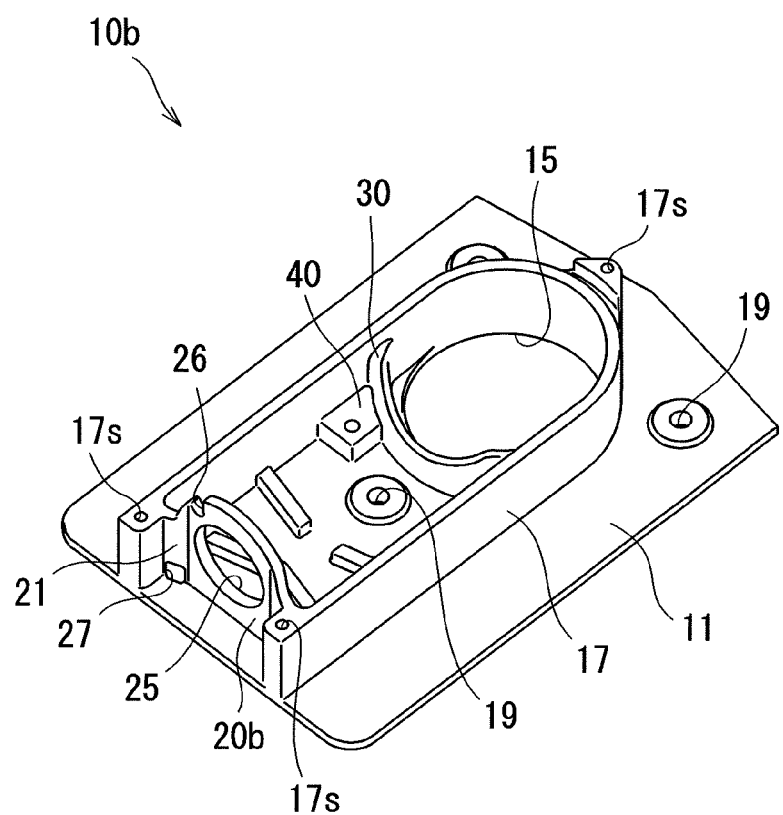
FIG. 6 is a perspective view of a main body according to a variation.
Figure 7:
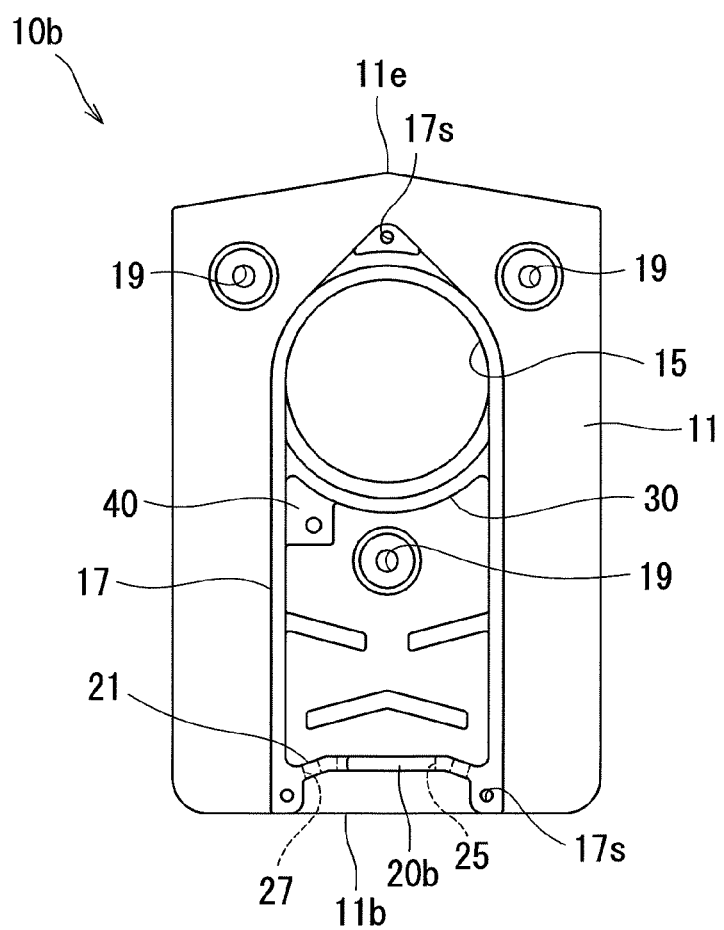
FIG. 7 is a plan view of the main body in FIG. 6.

For example, although the connector supporting portion 20 is linear in plan view as an example in the above description, a main body 10b according to a variation can include a connector supporting portion 20b both sides of which are inclined so as to be closer to the end side 11b toward the standing wall portion 17, as illustrated in FIGS. 6 and 7. The small-hole portions 27 are formed at the positions being boundaries with the base portion 11 and being boundaries with the standing wall portion 17 similarly to the main body 10. Therefore, the small-hole portions 27 are opened in portions 21 inclined on both sides in the connector supporting portion 20b. This configuration provides the following advantages. That is, rainwater discharged through the small-hole portions 27 easily flows down toward both outer sides, and the risk that the rainwater retains in the vicinity of the small-hole portions 27 can be reduced. In FIGS. 6 and 7, the same reference numerals denote similar components to those of the wire leading tool 1.

Although the pipe connector 60 is fixed to the connector supporting portion 20 with the nut 62 as an example in the above description, the invention is not limited thereto. Alternatively, the pipe connector 60 can be fixed to the connector supporting portion 20 by providing a screwed groove in the inner circumferential surface of the insertion hole 25 and screwing the external thread 61 of the pipe connector 60 with the screwed groove.

What is claimed is:

1. A wire leading tool for leading a wire into a building from an upper side of a roof, the wire leading tool comprising:
    a main body and a lid body that is detachably attached to the main body, wherein the main body includes:
    a flat plate-shaped base portion; a base hole portion that is penetratingly provided in the base portion;
    a standing wall portion that stands from the base portion in a U shape and surrounds the base hole portion by a curved portion of the U shape; and
    a connector supporting portion that stands from the base portion at a position opposite to the base hole portion near an open end of the U shape of the standing wall portion, is connected to the standing wall portion on both sides, and has an insertion hole which is penetratingly provided for inserting a pipe connector, and the lid body includes:
    a peripheral wall portion that surrounds the standing wall portion; and
    a covering portion that covers a space surrounded by the standing wall portion.

2. The wire leading tool according to claim 1,
    wherein the connector supporting portion has equal to or more than one small-hole portion formed on a boundary with the base portion, and
    a hole size of the small-hole portion is equal to or smaller than 6 mm.

3. The wire leading tool according to claim 1,
    wherein the main body and the lid body are made of metal,
    the lid body has a screw hole portion and the standing wall portion has a screwed groove,
    in a state in which the covering portion covers the space surrounded by the standing wall portion, a screw inserted through the screw hole portion and screwed with the screwed groove fixes the lid body to the standing wall portion, and
    the screw allows the lid body and the main body to be electrically conducted to each other by causing saw teeth provided on a screw head or saw teeth provided on a washer which is made to abut against the screw head to bite the lid body.

4. The wire leading tool according to claim 1, wherein the main body further includes an arc-shaped wall, the arc-shaped wall stands from the base portion in a circular arc shape along a part of a peripheral edge of the base hole portion and is connected to the standing wall portion on both sides to form a substantially circular shape together with the curved portion of the standing wall portion, and an upper end of the arc-shaped wall is formed in a circular arc shape recessed downward so as to be lowered as is farther from the standing wall portion and be the lowest at a center.

5. The wire leading tool according to claim 1, wherein the base portion has a ridge-side end side forming an inverted V shape.

\* \* \* \* \*